United States Patent

[11] 3,609,530

| [72] | Inventor | Alan Braid Johnson<br>Abingdon, England |
| --- | --- | --- |
| [21] | Appl. No. | 804,916 |
| [22] | Filed | Mar. 6, 1969 |
| [45] | Patented | Sept. 28, 1971 |
| [73] | Assignee | United Kingdom Atomic Energy Authority<br>London, England |
| [32] | Priority | Mar. 13, 1968 |
| [33] | | Great Britain |
| [31] | | 12306/68 |

[54] MAGNETIC LEAKAGE FIELD FLAW DETECTOR WITH COMPENSATION FOR VARIATION IN SPACING BETWEEN MAGNETIZER AND TEST PIECE
6 Claims, 8 Drawing Figs.

[52] U.S. Cl. .................................................. 324/37, 324/45
[51] Int. Cl. .................................................. G01r 33/12
[50] Field of Search .................................... 324/37, 40, 45

[56] References Cited

UNITED STATES PATENTS

| 1,867,685 | 7/1932 | Sperry ........................ | 324/37 |
| --- | --- | --- | --- |
| 1,998,952 | 4/1935 | Edgar et al. ................. | 324/45 |
| 2,011,425 | 8/1935 | Sperry et al. ................ | 324/37 |
| 3,195,043 | 7/1965 | Burig et al. ................. | 324/45 |
| 3,271,664 | 9/1966 | Mountz et al. .............. | 324/37 |

FOREIGN PATENTS

| 1,506,642 | 12/1967 | France ....................... | 324/37 |
| --- | --- | --- | --- |
| 171,639 | 11/1965 | U.S.S.R. ..................... | 324/37 |
| 447,629 | 3/1968 | Switzerland ................ | 324/34 |
| 822,210 | 10/1959 | Great Britain .............. | 324/45 |

*Primary Examiner*—Rudolph V. Rolinec
*Assistant Examiner*—R. J. Corcoran
*Attorney*—Larson, Taylor & Hinds ABSTRACT: A device for sensing magnetic discontinuities comprises a magnet for inducing magnetism in a sample, and a detector and amplifier for detecting the induced magnetism. A Hall effect crystal is included in the flux path between the magnet and the specimen. The Hall effect crystal is arranged to control the detector amplifier so as to nullify the effect of variations in the gap between magnet and specimen.

MAGNETIC LEAKAGE FIELD FLAW DETECTOR WITH COMPENSATION FOR VARIATION IN SPACING BETWEEN MAGNETIZER AND TEST PIECE

BACKGROUND OF THE INVENTION present invention relates to the detection of magnetic discontinuities. This technique is used for detecting cracks in such materials as steel and it may also be used as an accurate method of counting the number of sheets in a stack of pressings even though the edges may be quite seriously deformed.

It will be known that a Hall effect device or crystal is a right-rectangular prism of semiconducting material in which a current I passing in the z direction in the presence of a magnetic field B in the y direction causes a voltage V to be generated between the remaining faces of the prism, i.e. in the x direction. This voltage is proportional to both the current and the magnetic field. Hall effect crystals have been used as magnetic discontinuity sensing devices where they can be used to detect the surface leakage field. It has also been proposed to use other devices for detecting this field.

It is possible in theory to set up the magnetizing field by means of a permanent magnet, preferably of the horseshoe shape, but unfortunately variations in the induced field are caused by changes in the effective gap between the poles of the permanent magnet and the specimen; this of course does not apply to the case where the whole material is bulk magnetized but on the other hand the use of a small magnet is extremely desirable in order to provide a portable probe.

SUMMARY OF THE INVENTION

According to the present invention there is provided a magnetic device for detecting defects in a specimen comprising a magnetic circuit formed in part by the specimen, magnetizing means included in the magnetic circuit for inducing magnetism in the magnetic circuit, signal generating means responsive to leakage magnetic flux from the specimen, which signal generating means is located to detect magnetic flux from part of the specimen within the aforesaid magnetic circuit, amplifier means for amplifying signals from the signal generating means, and control means preferably comprising a Hall effect crystal, responsive to changes in magnetic flux in the magnetic circuit for controlling the effective gain of the amplifier means.

It will be understood that the Hall effect crystal will sense the variations in the leakage field due to changes in the effective gap between the magnet poles and the specimen and by virtue of the properties of this crystal the effective gain of the amplifier is set in such a way as to nullify the effect of gap variations. In practice the Hall effect crystal may be adjacent one pole of the magnet and a suitable spacer may be located adjacent the other pole. The magnet is very desirably a permanent magnet.

In one arrangement the signal generating means comprises a magnetic tape recording head which is moved relatively to the specimen and generates a signal which is a measure of the leakage flux from the specimen.

Alternatively the signal generating means may comprise a fixed signal source and a probe unit which is a further Hall effect crystal.

Desirably in this latter case and as will be explained in detail hereinafter the probe unit comprises a stack of three Hall effect crystals arranged so that the magnetic flux from the specimen passes through all the crystals, the output from the probe being the sum of the signals from the two outside crystals less twice the signal from the center crystal. This arrangement gives increased discrimination against unwanted signals.

DESCRIPTION OF PREFERRED EMBODIMENTS

In order that the present invention may more readily be understood certain embodiments of the same will now be described by way of example and with reference to the accompanying drawings wherein.

Figure 1:
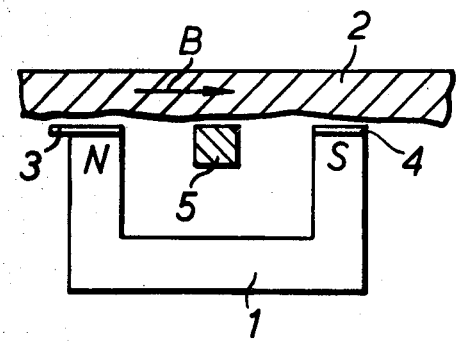
FIG. 1 is a diagrammatic representation of the lay out of the sensing device.

Referring firstly to FIG. 1 it will be seen that a horseshoe magnet 1 having poles N and S is located adjacent to a specimen 2 so as to induce therein a magnetic field B. Between the N pole of the magnet 1 and the specimen 2 is a Hall effect crystal 3 while between the other pole and the specimen is a spacer 4 of similar dimensions. Located between the poles is a probe 5.

Figure 2:
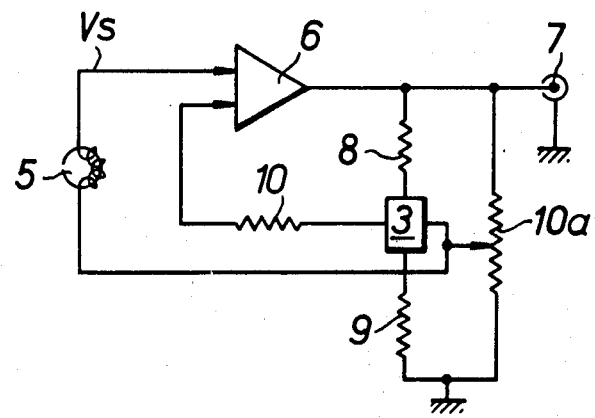
FIG. 2 is a circuit diagram

In the first embodiment of the invention the probe 5 is a magnetic tape recording head and a circuit similar to that shown in FIG. 2 may be used. As the assembly is moved relatively to the specimen the tape head 5 generates a signal which is passed to an amplifier 6 and thence to an output terminal 7. Part of the signal from the amplifier 6 is applied to the Hall effect crystal 3 via resistors 8 and 9. The voltage developed across the Hall effect crystal is applied via a resistor 10 equal to the DC resistance of the tape head 5 to affect the gain of the amplifier 6 by negative feed back. The Hall effect crystal 3 is biassed by a variable resistor 10a connected between the output of the amplifier 6 and earth in order to compensate for small device errors.

Figure 3:
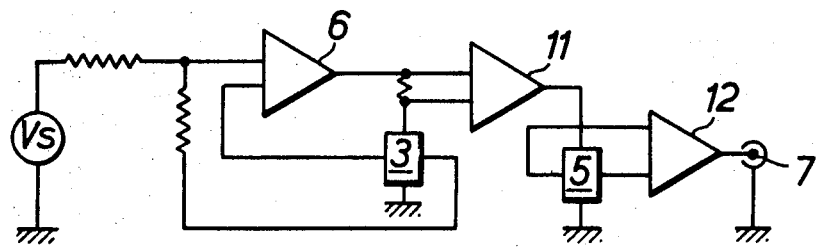
FIG. 3 is a modified circuit diagram

If, on the other hand, the probe 5 is a further Hall effect crystal a circuit similar to that shown in FIG. 3 is suitable. In this circuit a signal source $V_s$ feeds an amplifier 6 similar to the amplifier of FIG. 2 and the Hall effect crystal compensator 3 is connected in a similar way. In place of the signal output 7 of FIG. 2 there is a further amplifier 11 which supplies the current for the probe crystal 5, the output of this crystal being supplied to yet another amplifier 12.

For any Hall effect crystal we have the expression $$V_H = k_H B \quad (1)$$

and this expression may be rearranged as follows:

$$R_H = V_H/I_H = kB \quad (2)$$

In the FIG. 3 arrangement the amplifier 6 should have the following characteristics:

$$I = g_m(V_S - V_H) = g_m(V_s - I \cdot R_H) \quad (3)$$

Hence:

$$I = \frac{g_m \cdot V_s}{1 + R_H \cdot g_m} = \frac{V_s}{\frac{1}{g_m} + R_H} \quad (4)$$

Where $I$ = Current output $V_S$ = Signal voltage input $g_m$ = forward transconductance If the forward transconductance of this amplifier is made very high then the expression $1/g_m$ may be ignored with respect to $R_H$ giving the following expression:

$$I = V_s/R_H = V_s/kB$$

If this current after amplification as necessary in amplifier 11, is now applied to the Hall effect crystal 5 in the probe, the output of the probe will be $$V_d = k' I \cdot B' \text{ from (1)} \quad (6)$$

Where $V_d$ is the defect signal $K'$ is the Hall constant and $B'$ is the leakage field Equation 6 can be rewritten:

$$V_d = k'/k \cdot V_s \cdot B'/B \quad (7)$$

It will be seen that the defect signal is not dependent upon the magnetization as it can be expected that B and B' will vary in sympathy for most changes in gap.

Figure 4:
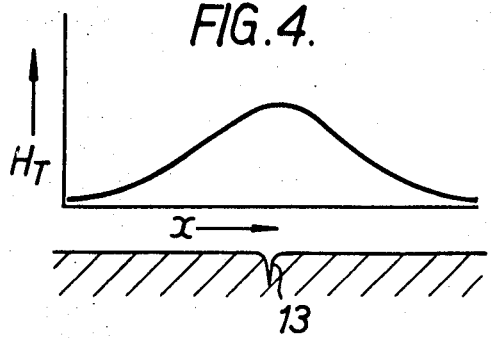
FIGS. 4, 5 and 6 show plots obtained with the device.
Figure 5:
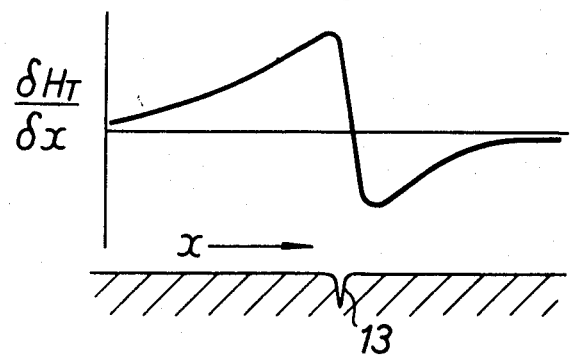

Referring now to FIG. 4 it will be seen that the tangential component of the leakage field (which is that component which is detected) changes slowly over the defect, shown as a crack at 13. This makes the precise location of the defect difficult to achieve. If, on the other hand, and as shown in FIG. 5, the tangential field gradient or rate of change of the tangential field is measured instead of measuring the tangential field there is a much more rapid change over the defect 13 which permits a more precise location. The disadvantage of this form of measurement is that the signal output is of difficult form to monitor and the operator may need to make several checks over the area to satisfy himself.

Figure 6:
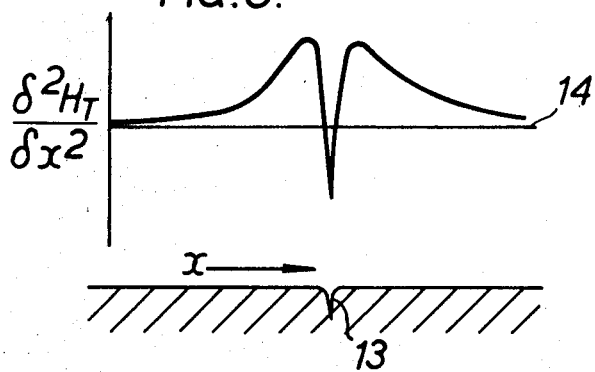

If therefore the gradient of the curve of FIG. 5 or the second derivative of the curve of FIG. 4 is plotted as shown in FIG. 6 a single negative excursion extending over the length of the defect is produced. This type of signal lends itself to automatic interpretation and a signal light can be arranged for energization as the plot crosses the datum line 14.

The various differentiation processes can conveniently be done by subtraction of adjacent field strength readings and in this connection the physical arrangement of the Hall effect crystal has considerable advantages. The actual thickness of such a crystal in the $y$ direction is of the order of 0.001 inch and hence three such plates may be assembled in contact with their faces normal to the $y$ direction so that the magnetic field passes through all the crystals and this arrangement can be used to measure $\frac{\partial^2 H_T}{\partial x^2}$ at a localized point of the order of 0.005 inch.

Figure 7:
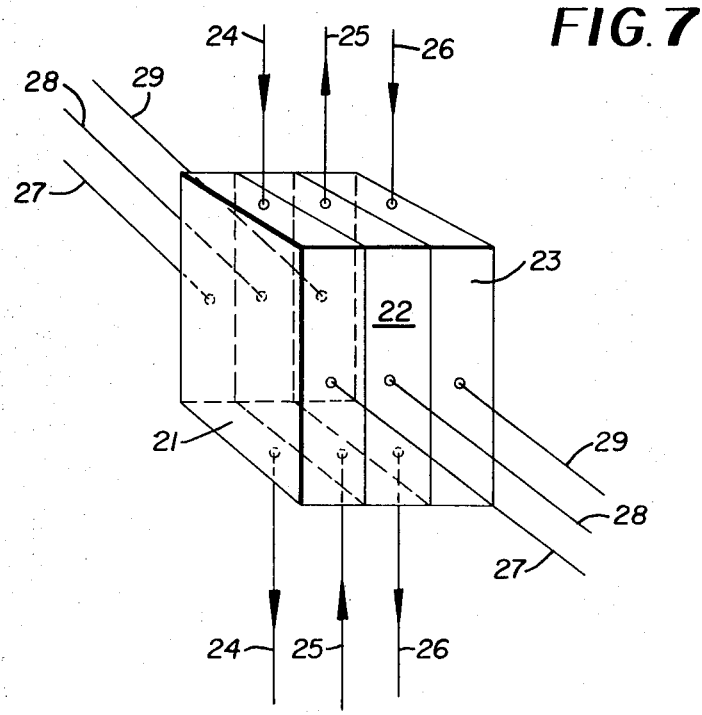
FIG. 7 is a perspective view of three stacked Hall crystals and the associated leads therefor.

An arrangement of three such crystals 21, 22, 23 is shown in FIG. 7. The crystals have connecting leads 24, 25, 26 for an excitation current supply and connecting leads 27, 28, 29 for the output signals. With this arrangement we have the expression $$\frac{\partial^2 H_T}{\partial x^2} \simeq (V_{H_1} - V_{H_2}) - (V_{H_2} - V_{H_3}) \qquad (8)$$

Where $V_{H_n}$ is the output voltage from the Hall crystal $H_n$.

Equation (8) can be transformed to:

$$\frac{\partial^2 H_T}{\partial x^2} \simeq V_{H_1} + V_{H_3} - 2V_{H_2} \qquad (9)$$

Figure 8:
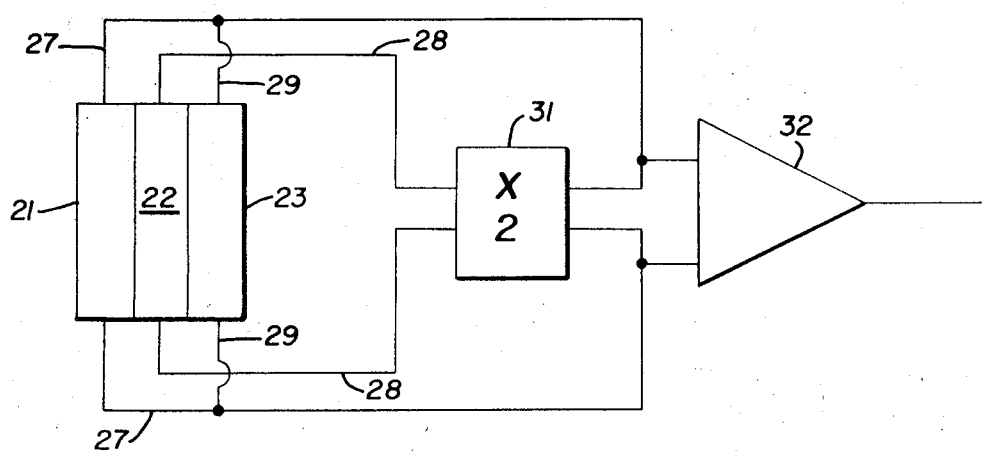
FIG. 8 is a circuit diagram for providing arithmetical addition of the outputs of the crystals of FIG. 7.

FIG. 8 illustrates how the arithmetical addition may be carried out. The output from the second crystal 22 (H2) is rendered negative by reversing its excitation current, as indicated by the arrows on leads 24, 25, 26 in FIG. 7. This output is doubled by device 31 and the output from device 31 is connected to the joined outputs on leads 27 and 29 and fed to an adding amplifier 32. In this way, the doubled signal output from the second crystal 22(H2) is subtracted from the sum of the first and third crystals 21, 23 (H1,H3).

The invention is not restricted to the details of the foregoing examples. For instance, the gain of amplifier 6 need not necessarily be controlled by a Hall effect crystal but may be controlled by other suitable means responsive to changes in the magnetic flux in the flux path between the magnet 1 and the specimen 2. For example, a magnetoresistor may be used instead of the Hall effect crystal. A magnetoresistor has a resistance approximately proportional to the applied magnetic field, within a range of magnetic fields. To make use of a magnetoresistor in place of the Hall crystal 3 of FIG. 2, the magnetoresistor is connected between earth and one input of amplifier 6, with an error compensating resistor connected in a feedback path, and the head 5 is connected between earth and the other input to amplifier 6.

I claim:

1. A magnetic device for detecting defects in a specimen comprising a magnetic circuit formed in part by said specimen, magnetizing means included in said magnetic circuit for inducing magnetism in the magnetic circuit, signal generating means responsive to leakage magnetic flux from the specimen, said signal generating means being located to detect leakage magnetic flux from part of the specimen within said magnetic circuit, amplifier means for amplifying the signals from the signal generating means, and control means responsive to changes in magnetic flux in the said magnetic circuit for controlling the effective gain of said amplifier means, said control means comprising a Hall effect crystal located in the magnetic circuit formed by said magnetizing means and the specimen.

2. A device as claimed in claim 1 wherein said magnetizing means comprises a magnet of the horseshoe type having magnetic poles, an airgap being defined between each of the magnetic poles of the magnet and the specimen, and said Hall effect crystal being located adjacent one of said magnetic poles to sense variations in the magnetic flux in the magnetic circuit due to changes in the airgap between the specimen and said one magnetic pole, said control means controlling the effective gain of the amplifier so as to nullify the effect of gap variations.

3. A device as claimed in claim 1 wherein said signal generating means comprises a magnetic tape recording head, the recording head together with the magnetizing means being moved relatively to the specimen, whereby the recording head generates a signal which is a measure of the leakage magnetic flux from the specimen.

4. A device as claimed in claim 1, wherein the magnetizing means is a permanent magnet.

5. A device as claimed in claim 1, wherein the signal generating means comprises a fixed signal source and a probe unit comprising a further Hall effect crystal.

6. A device as claimed in claim 5, wherein the probe unit comprises a stack of three Hall effect crystals which have output signal leads for carrying the output signals indicative of the magnitude of transverse magnetic field in which the respective Hall effect crystal is situated, the output signal leads of the two outside crystals being connected so that their signals add, the output signal leads of the center crystal being connected to means for doubling the signal amplitude, and the output from the said means for doubling the signal amplitude being connected to the joined output leads of the two outside crystals so as to subtract the doubled signal output of the center crystal from the sum of the signal outputs of the two outside crystals.

UNITED STATES PATENT OFFICE
CERTIFICATE OF CORRECTION

Patent No. 3,609,530           Dated September 28, 1971

Inventor(s) Alan Braid Joinson

It is certified that error appears in the above-identified patent and that said Letters Patent are hereby corrected as shown below:

Cover Page, First Column, correct the name of the inventor to read:--Alan Braid Joinson--

Signed and sealed this 11th day of April 1972.

(SEAL)
Attest:

EDWARD M.FLETCHER,JR.          ROBERT GOTTSCHALK
Attesting Officer              Commissioner of Patents